Patented July 7, 1942

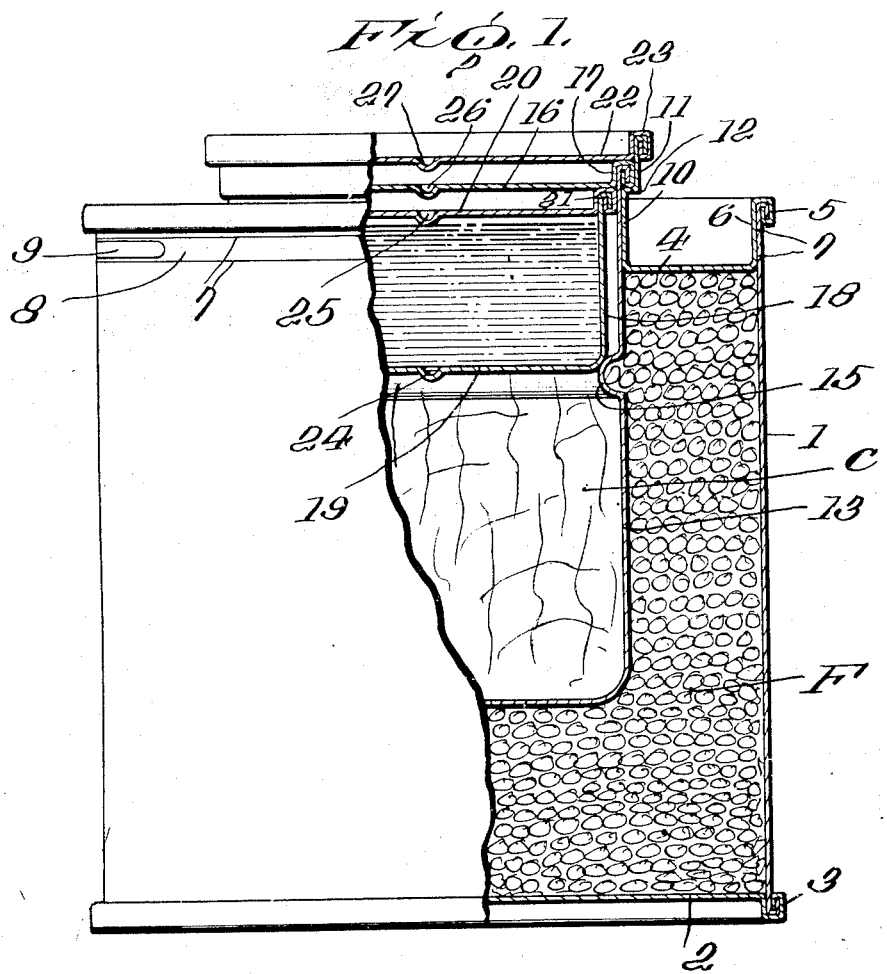

2,288,895

UNITED STATES PATENT OFFICE 2,288,895

SELF-HEATING CONTAINER

Henry A. Fink, Pelham Manor, N. Y., assignor to Continental Can Company, Inc., New York, N. Y., a corporation of New York Application October 9, 1940, Serial No. 360,491

2 Claims. (Cl. 220—8)

The invention relates to a self-heating food container consisting of sheet metal units having the parts thereof joined to each other by seaming.

An object of the invention is to provide a container of the above type which includes a storage compartment for the food product, a storage compartment for a heat generating chemical, and a storage compartment for a liquid, wherein each compartment includes a sheet metal body portion having a separate closure end secured thereto by seaming.

A further object of the invention is to provide a container of the above type wherein the sealed body portion for the heat generating chemical is suspended in the food compartment and the sealed body portion for the liquid is supported within the sealed body portion for the heat generating chemical.

A still further object of the invention is to provide a container of the above type wherein each end closure and the bottom of the body portion containing the liquid are provided with indented thinned portions arranged in alignment so as to facilitate the puncturing of the bottom wall of the liquid container by a piercing tool.

In the drawing which shows by way of illustration one embodiment of the invention:

Figure 1 is a view partly in side elevation and partly in section showing a self-heating food container embodying the invention;

Fig. 2 is an enlarged sectional view through the upper portion of the self-heating container and at one side thereof, the tearing strip being partially removed for the opening of the compartment containing the food product.

The invention relates broadly to a chemically, self-heating food container and comprises an outer container made of sheet metal for the food product, said container having ends seamed thereto. There is also an inner container suspended within the outer food container which serves as a heating unit for the food product. This inner container serves as a storage compartment for the heat generating chemical and also as a storage compartment closed container containing the liquid. Each of the three containers, that is, the container for the food product, the heating unit container and the liquid container, are each closed and sealed by a separate closure end which is secured in place by seaming.

Referring more in detail to the drawing which shows by way of illustration one embodiment of the invention, the outer container includes a body portion 1 to which a bottom end 2 is secured by the usual double seam indicated at 3. Also secured to the body portion 1 is a top end member 4 which is likewise secured to the body portion by the usual double seam indicated at 5. Said top end 4 has a deeper depression forming a vertical wall 6 contacting with the inner wall of the body portion 1. Said body portion 1 is scored along the lines 7, 7, setting off a tearing strip 8 which is provided with the usual tongue 9 to which a key may be attached. These score lines 7, 7 are usually formed on the inside of the container and they are covered by this vertical wall 6 of the end member 4.

Said end member 4 has a central opening therethrough with an upstanding vertical wall 10 which surrounds said opening. Said wall is offset outwardly at 11, thus forming a supporting shoulder 12.

The heating unit includes a sheet metal body portion 13 which is preferably formed of drawn metal so that the bottom 14 is integral with the body portion. Said body portion, as illustrated in the drawing, is provided with an inwardly projecting bead 15 which forms a supporting shoulder. The body portion 13 of the heating unit is closed by an end member 16, which end member is secured to the body portion 13 by the usual double seam indicated at 17. This body portion is so dimensioned that the body wall will slip down through the opening into the food container, said body wall making contact with the upstanding vertical wall 10 of the end member 4. The double seam 17 engages the supporting shoulder 12 and thus the heating unit is suspended in the food container.

Disposed within the heating unit is a liquid container which includes a body portion 18. This body portion is preferably made of drawn metal and the bottom 19 is integral with the body portion 18. Said container for the liquid is closed and sealed by a closure end 20 which is double seamed to the body portion 18 in the usual manner as indicated at 21. This liquid container is so dimensioned that the double seam slips into the body portion 13 and the bottom of the liquid container rests on the shoulder formed by the bead 15 in the body wall 13. The end member 16 which closes the heating unit contacts with the upper side of the double seam 21 and holds this container with the liquid therein in contact with the supporting shoulder formed by the bead 15.

The heat generating chemical is indicated at C. It is placed in the body portion 13 of the heating unit, filling said heating unit up to the lower side of the hollow bead 15. The container 18 for the liquid is filled and sealed and then the container is placed in the body portion 13 after which the end member 16 is secured to the body portion 13 by seaming. This completes the heating unit. The heating unit is preferably inserted in the outer container for the food product by the manufacturer of the container. It is placed on the shoulder 12 after which a closure end 22 is secured to the upstanding wall 10 by the usual double seam indicated at 23. The bottom end is not attached by the manufacturer. The container thus described is shipped to the packer who inverts the container, fills it with the food product indicated at F, after which the bottom end 2 is secured to the container for sealing the same.

The bottom wall 19 of the liquid container 18 is provided with an indentation 24 which thins the metal, but does not rupture the same. This indentation extends downwardly as viewed in Figure 1. The end members 20, 16 and 22 are each provided with a similar indentation indicated at 25, 26 and 27, respectively. These four indentations are in alignment so that when it is desired to heat the food product, a piercing tool placed in the outer indentation 27 will readily rupture the metal, follow through into contact with the indentation 26, rupturing the metal in the end 16, then following through into contact with the indentation 25, rupturing the metal in the end 20, and it will continue to follow through and engage the indentation 24 in the bottom wall of the liquid container, rupturing the same, permitting the liquid to flow through into contact with the heat generating chemical. This re-acts to produce the heat for heating the food product.

It will be noted that the wall 10 in the closure end 4 extends upwardly so that the double seam 23 is well above the plane of the double seam 5. This greatly facilitates the securing of the end member 22 to the upstanding wall 10, because seaming rolls can be moved inward so as to contact with the usual flange on the can end and the flange on the body wall for rolling the parts into a double seam.

It will also be noted that the compartment for the liquid is formed by a completed sheet metal container which is a unit of itself. The compartment may be filled with the liquid and the end attached and seamed thereto, so that when the liquid containing unit is assembled with the heating unit storing the chemical, there is no likelihood of the liquid contacting with the chemical until the walls of the liquid container are ruptured by the piercing of the indentations. It will also be noted that the end member 16 is attached to the body wall of the heating unit after the liquid container has been inserted therein, and this completes and seals the heating unit. It will likewise be noted that this sealed heating unit is placed in the opening in the end member 4 of the outer food container and is supported therein by the shoulder 12. The end member 22 may be double seamed to the wall 10 and this will secure the heating unit in place. All of the double seams which are used in the construction of the container and the various parts thereof are formed by rolling together two contacting pieces of metal and this enables a very tight firm double seam to be made.

It is obvious that minor changes may be made in the details of construction without departing from the spirit of the invention as set forth in the appended claims.

Having thus described the invention, what I claim as new and desire to secure by Letters Patent, is:

1. A self-heating food container comprising an outer sheet metal container for the food product including the body portion and end members seamed thereto, one of said end members having a central opening with an upstanding wall surrounding the same, said upstanding wall having formed therein an upwardly facing supporting shoulder, an inner sheet metal container forming a heating unit disposed in said outer container and including a cylindrical body portion having a closure end seamed thereto and adapted to fit within said opening and dimensioned so that the seam joining closure member to the body portion rests on said shoulder and supports said heating unit, a container for a liquid having a closure end seamed thereto, supported in the upper portion of said heating unit and a closure end for the outer sheet metal container seamed to the upper edge portion of said upstanding wall.

2. A self-heating food container comprising an outer sheet metal container for the food product including a body portion and end members seamed thereto, one of said end members having a central opening with an upstanding wall surrounding the same, said upstanding wall being offset outwardly to provide a supporting shoulder, an inner sheet metal container forming a heating unit disposed in said outer container and including a cylindrical body portion having a closure end seamed thereto and adapted to fit within said opening and dimensioned so that the seam joining the closure member to the body portion rests on said shoulder and supports said heating unit, a container for a liquid having a closure end seamed thereto supported in the upper portion of said heating unit, and a closure end for the outer sheet metal container seamed to the upper edge portion of said upstanding wall, said wall being dimensioned so that said seam joining the closure member to the wall is disposed well above the plane of the seam joining the upper end member to the body portion of the outer container.

HENRY A. FINK.